United States Patent [19]
Chancellor

[11] Patent Number: 6,041,829
[45] Date of Patent: Mar. 28, 2000

[54] UNDERSEA PIPE

[75] Inventor: Dennis Chancellor, Camarillo, Calif.

[73] Assignee: Nate International, Woodland Hills, Calif.

[21] Appl. No.: 09/107,718

[22] Filed: Jun. 30, 1998

Related U.S. Application Data

[60] Provisional application No. 60/051,192, Jun. 30, 1997.

[51] Int. Cl.[7] ....................................................... F16L 9/00
[52] U.S. Cl. ................................... 138/177; 138/DIG. 11
[58] Field of Search ........................... 138/177, DIG. 11, 138/178; 405/43, 45

[56] References Cited

U.S. PATENT DOCUMENTS

| | | | |
|---|---|---|---|
| 4,245,924 | 1/1981 | Fouss et al. | 405/43 |
| 5,002,429 | 3/1991 | Roberts | 405/43 |
| 5,275,506 | 1/1994 | Grimsley | 405/43 |

*Primary Examiner*—Andres Kashnikow
*Assistant Examiner*—Davis Hwo
*Attorney, Agent, or Firm*—Fish & Associates, LLP; Robert D. Fish

[57] ABSTRACT

An improved pipe for positioning on the bottom of a body of water comprises a non-cylindrical shape and a widened, bottom contacting, base portion. Various embodiments of the improved pipe have a decreased tendency to float, to migrate upwards through a covering material, and/or to clog.

The improved pipe may advantageously comprise a 'D' shape wherein the widened, bottom contacting, base portion of the pipe is the flat portion of the 'D'. The pipe may also have wings which extend the width of the base portion beyond the point at which the curved wall of the pipe contacts the base portion. The pipe may also have filter plugs removeably engaged in fluid inlet/outlet orifices. In some embodiments, the orifices will be positioned on the bottom of the pipe as part of the widened bottom contacting base portion.

10 Claims, 3 Drawing Sheets

UNDERSEA PIPE

This application is entitled to and hereby claims priority based on U.S. patent application Ser. No. 60/051,192, said application being incorporated herein by reference.

FIELD OF THE INVENTION

The field of the invention is submerged and buried pipes.

BACKGROUND OF THE INVENTION

Pipes submerged within a body of water are often used to, among other things, transport fluids and/or to act as a conduit for wires, cables, and hoses. (As contemplated herein, the term "submerged within a body of water", includes at least partially burying the pipe in the material comprising the bottom of the body of water, and the body of water is contemplated to comprise any body of water including, but not limited to, oceans, lakes, and rivers.) One of the chief problems associated with placing a pipe beneath the surface of a body of water is that the pipe tends to float.

One method which may be utilized to prevent the pipe from floating is to bury the pipe anywhere from several inches to several feet below the floor of the body of water. However, there is often a tendency for the buried pipe to migrate upwards through the covering material, especially if the covering material comprises a liquefied particulate such as sand or silt. It is possible, in some instances, to supplement the covering material with an additional material such as concrete, but such a solution increases the costs associated with both laying and maintaining the pipe.

For pipes equipped with orifices for fluid inlet or outlet, the existence of "fines" such as sand and fine gravel in the cover material, or otherwise nearby, tends to be problematic. Among other things, fines tend to contaminate any fluid flowing into the pipe, and cause the pipe to clog. Although covering the orifices with filters provides a possible solution, such filters also tend to become clogged over time, thereby reducing throughput, or requiring reverse flow cleaning and eventual replacement of the pipe. The difficulties associated with pipe replacement, as alluded to previously, are often increased by measures used to prevent pipe flotation and/or migration.

Thus there is a continuing need to develop improvements to pipes to decrease their tendency to float and migrate upwards through a covering material, and to decrease the number of times and frequency that the pipe needs to be replaced.

SUMMARY OF THE INVENTION

The present invention is directed to an improved pipe for positioning on the bottom of a body of water, wherein the pipe comprises a non-cylindrical shape, and a widened, bottom contacting, base portion. Such pipes have a decreased tendency to float, to migrate upwards through a covering material, and/or to clog.

In a preferred embodiment, the improved pipe comprises a 'D' shape wherein the widened, bottom contacting, base portion of the pipe is the flat portion of the 'D'. In more preferred embodiments, the pipe is substantially 'D' shaped, but incorporates wings which extend the width of the base portion beyond the point at which the curved wall of the pipe contacts the base portion. In still more preferred embodiments, the pipe comprises filter plugs removeably engaged in fluid inlet/outlet orifices. In some embodiments, the orifices are advantageiously positioned on the bottom of the pipe as part of the widened bottom contacting base portion.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
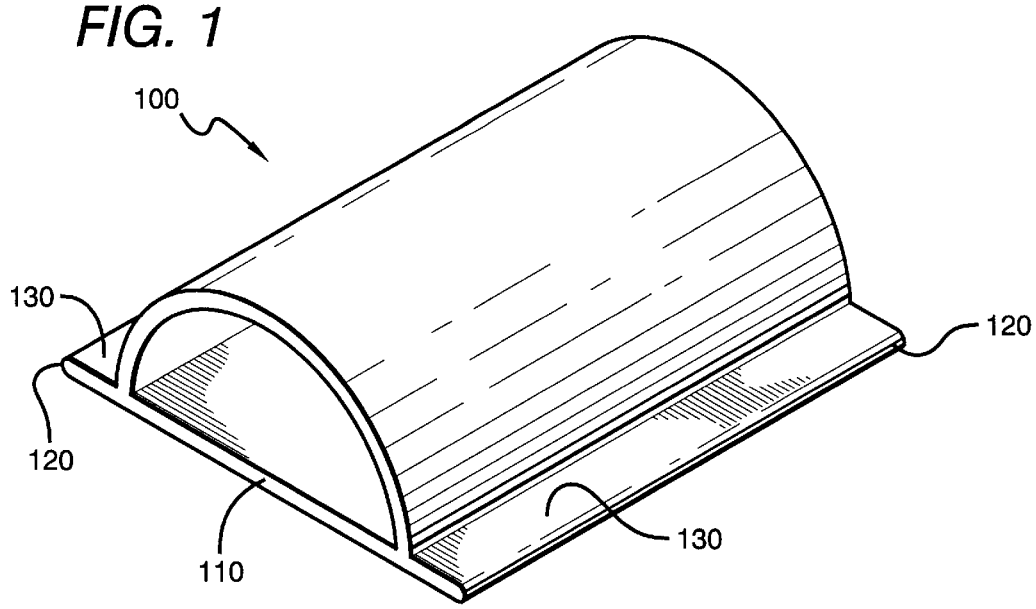
FIG. 1 is a perspective view of a first pipe embodying the invention.

Referring first to FIG. 1, a pipe 100 is substantially 'D' shaped and comprises a widened, bottom contacting, base portion 110, with the base portion 110 having edges 120 generally contacting the bottom of the body of water. It is contemplated that pipe may be positioned in a number of ways relative to the bottom of the body of water. One method would be to place the pipe so that it simply rests on the bottom. Another would be to bury the entire pipe within the bottom, and yet another would be to only partially bury the pipe so that base portion 110 is buried in the bottom, but some other portion of the pipe is left unburied.

Figure 5:
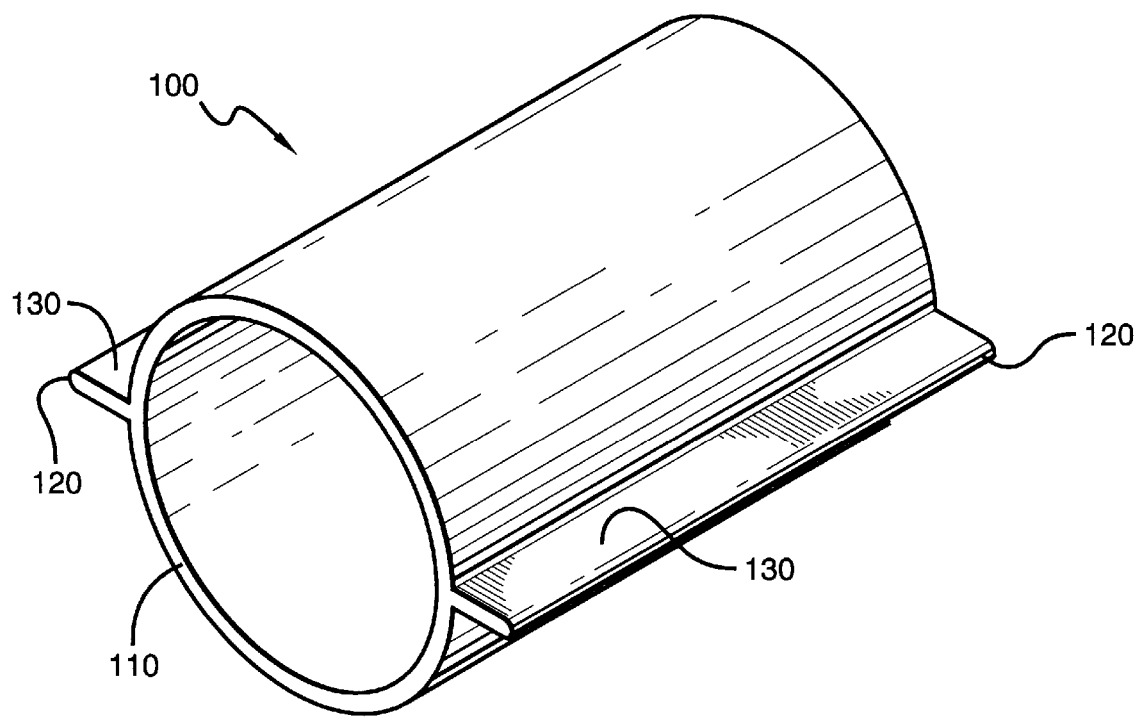
FIG. 5 is a perspective view of a fifth pipe embodying the invention.

It is preferred that the base portion 110 is substantially flat, as shown in FIG. 1, and that most of the base is in contact with the bottom. (Substantially flat, as contemplated herein, is intended to cover any surface having raised and lower portions wherein the distance of any point on the surface from an imaginary plane, positioned so as to maximize the areas of intersection between the plane and the surface, is less than 10% of the width of the surface.) In other embodiments, the base portion 110 may comprise a non-flat surface which may be concave in nature. The base portion must be either flat or concave in the areas adjacent edges 120, but otherwise might take on various simple or complex shapes as shown in FIGS. 2, 3, and 5.

In other aspects, pipes according to the inventive subject matter may advantageously comprise PVC or other plastic, although metals, alloys, composites and other materials are contemplated as well. Lengths of pipe may be glued, butt-welded together, or may be connected through the use of special connectors, such as female-female connectors. Lengths of pipe may range from a few feet to twenty feet or more, and may advantageously have "wings" or other lateral extensions, such as wings 130 in FIGS. 1, 2, 3, and 5, which help to maintain the position of the pipe. Although the actual dimensions of such wings may vary, it is contemplated that, for some embodiments, the inclusion of wings will result in a pipe which is at least 60% wider than it is tall.

Figure 4:
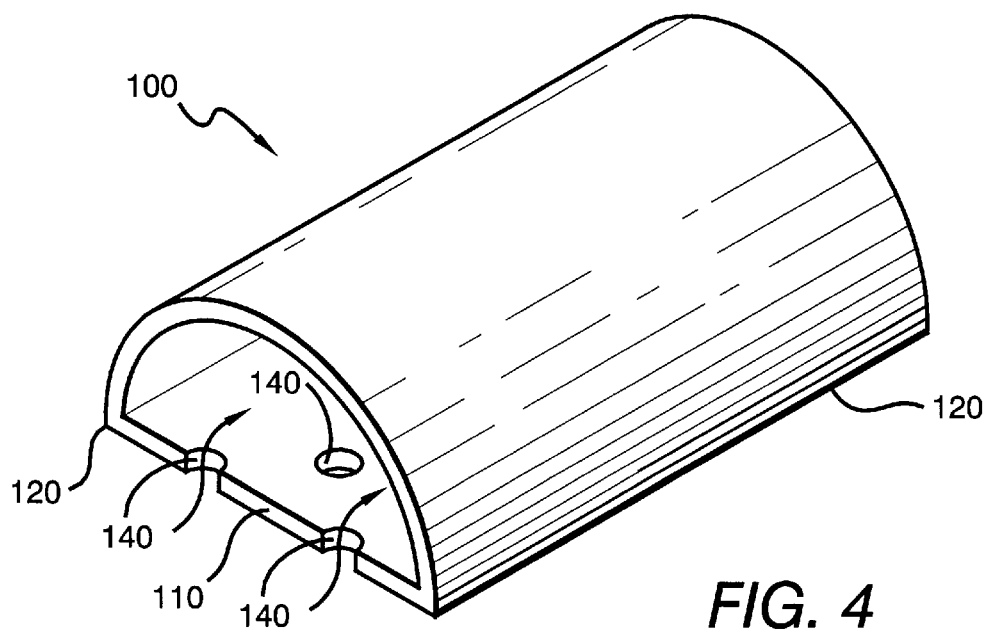
FIG. 4 is a perspective view of a fourth pipe embodying the invention.

For pipes incorporating orifices for fluid transfer through the wall of the pipe, it is preferred that the orifices be part of the base portion of the pipe, although inclusion in other portions is also contemplated. An example of the inclusion of orifices 140 in the base portion of the pipe 100 can be seen in FIGS. 2 and 4. It is anticipated that the placement of the orifices 140 in the base portion 110 of the pipe will assist in preventing the clogging of the orifices. The size and shape of the orifices may be varied to include, among others, rectangular, or elliptical slots, and circular holes.

Figure 2:
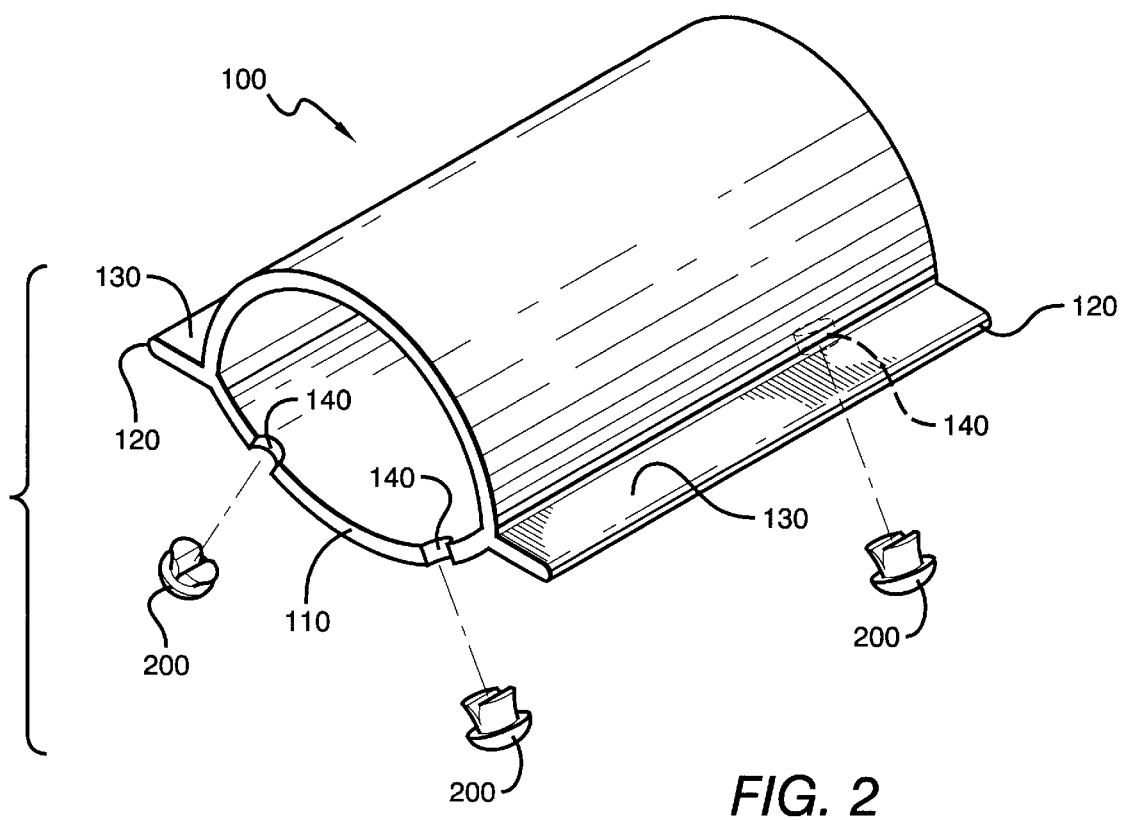
FIG. 2 is a perspective view of a second pipe embodying the invention.
Figure 3:
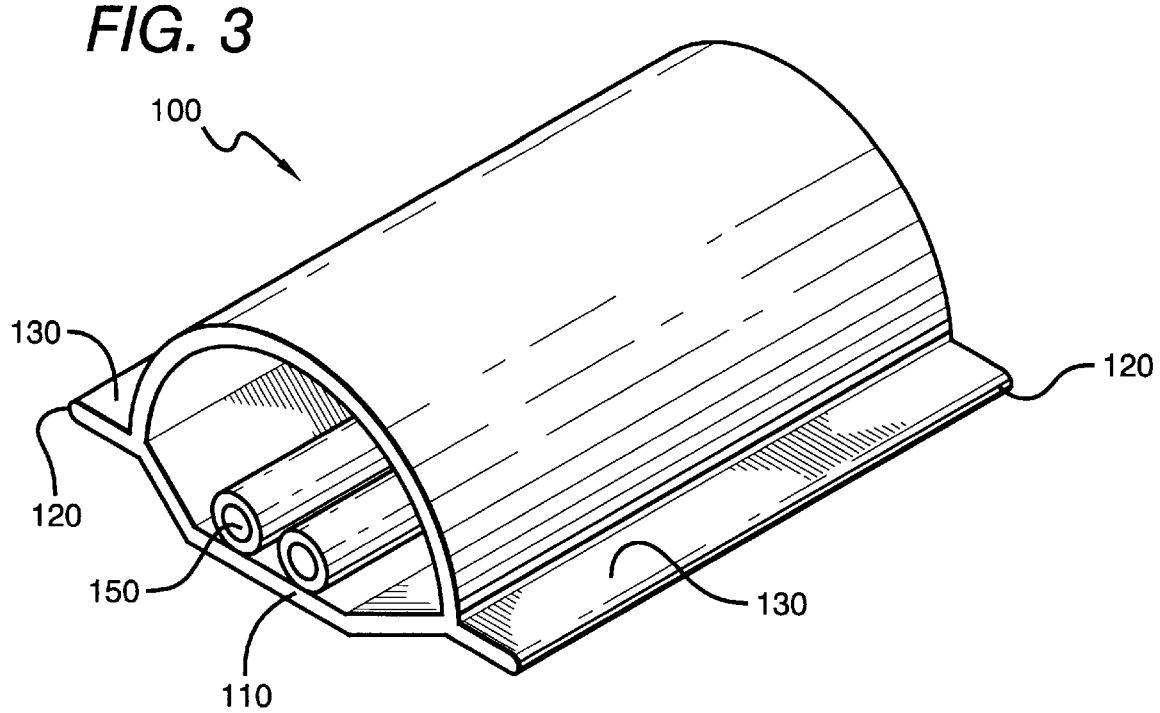
FIG. 3 is a perspective view of a third pipe embodying the invention.

Referring to FIG. 2, it is contemplated that, in some embodiments of pipes incorporating orifices for fluid transfer through the walls of the pipe, that removeable filter plugs 200 will be engaged in the orifices. In such instances, it is contemplated that the plugs will be sized and dimensioned so as to allow the passage of liquids through the plugs, and thus through the orifices, and to prevent the flow of liquids through the orifices unless the liquids pass through the plugs. The plugs will act as filters by preventing the passage of at least some solids sized smaller than the orifices from passing through the orifices.

The plugs 200 are preferred to be rubberized, plasticized, or in some other manner configured to have both flexibility and shape memory so that plugs 200 can be readily installed into, and removed from the orifices 140. In other embodiments, plugs 200 may require assembly or disassembly following or prior to installation or removal. The size, shape, and material comprising the plugs id not deemed important so long as the plugs, while engaged in the orifices, allow the passage of at least some fluids and prevent the passage of at least some solids.

A possible method for positioning a submerged pipe may include the steps of (1) obtaining a pipe comprising a widened, bottom contacting, portion; (2) positioning the pipe on or at least partially within the bottom of a body of water with the base portion being the lowermost portion of the pipe and contacting or being buried within the bottom. As an example, one might obtain a 'D' shaped pipe and place the pipe on the bottom of a body of water such that the pipe was resting on the flat portion of the 'D'. It is contemplated that other methods may include additional steps such as (3) digging a trench within which to position the pipe, and/or (4) covering the pipe with a covering material.

Thus, specific embodiments and applications of an improved pipe have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:

1. A pipe comprising:
    an exterior surface, the surface comprising a widened, bottom contacting, base portion, the base portion having edges and being non-convex adjacent edges;
    a plurality of orifices;
    a plurality of filter plugs removeably engaged in the orifces such that the plugs can be installed or removed without replacing the pipe, the plugs;
        allowing the passage of liquids through the plugs, and thus through the orifices;
        the plugs sized and dimensioned to prevent the flow of liquids through the orifices unless the liquids pass through the plugs;
        and the plugs preventing the passage of at least some solids sized smaller than the orifices from passing through the orifices.

2. The pipe of claim 1, wherein the entire base portion is substantially flat.

3. The pipe of claim 1, wherein the pipe is 'D' shaped with the flat portion of the 'D' forming the widened, bottom contacting, base portion.

4. The pipe of claim 1, wherein the pipe is substantially 'D' shaped with the flat portion of the 'D' forming the widened, bottom contacting base portion, and the flat base further comprises wings which extend the base portion beyond the point at which the curved portion of the 'D' contacts the base portion.

5. The pipe of claim 3 further comprising a plurality of orifices extending through flat base portion, the orifices permitting fluid to flow through the base portion.

6. The pipe of claim 4 further comprising a plurality of orifices extending through flat base portion, the orifices permitting fluid to flow through the base portion.

7. The pipe of claim 1, wherein the installation or removal of the plugs can be accomplished manually.

8. The pipe of claim 1, wherein the plugs have both flexibility and shape memory such that they can be inserted or removed without having to be assembled or disassembled.

9. The pipe of claim 1, wherein insertion or the plugs requires assembly or disassembly of the plugs.

10. The pipe of claim 1, wherein both the orifices and plugs are rounded in shape.

* * * * *